(12) United States Patent
Choi et al.

(10) Patent No.: US 10,090,503 B2
(45) Date of Patent: Oct. 2, 2018

(54) CONNECTING MEMBER OF ELECTRODE TERMINALS FOR PREPARATION OF CORE PACK

(75) Inventors: Won Joon Choi, Chungcheongbuk-do (KR); Youngsun Park, Daejeon (KR); SooRyoung Kim, Daejeon (KR); Ho Yeong Yang, Uijeongbu-si (KR); Seunghyun Bang, Chungcheongbuk-do (KR); Kwang woo Nam, Cheonan-si (KR)

(73) Assignee: LG CHEM, LTD., Seoul (KR)

( * ) Notice: Subject to any disclaimer, the term of this patent is extended or adjusted under 35 U.S.C. 154(b) by 798 days.

(21) Appl. No.: 13/122,004

(22) PCT Filed: Oct. 13, 2009

(86) PCT No.: PCT/KR2009/005869
§ 371 (c)(1),
(2), (4) Date: Jul. 19, 2011

(87) PCT Pub. No.: WO2010/044588
PCT Pub. Date: Apr. 22, 2010

(65) Prior Publication Data
US 2011/0262777 A1    Oct. 27, 2011

(30) Foreign Application Priority Data

Oct. 14, 2008    (KR) .......................... 10-2008-0100712

(51) Int. Cl.
*H01M 10/42* (2006.01)
*H02G 5/00* (2006.01)
(Continued)

(52) U.S. Cl.
CPC ............. *H01M 2/204* (2013.01); *H01M 2/34* (2013.01); *H01M 10/425* (2013.01);
(Continued)

(58) Field of Classification Search
CPC ............. H01M 10/052; H01M 10/425; H01M 2200/00; H01M 2/105; H01M 2/204;
(Continued)

(56) References Cited

U.S. PATENT DOCUMENTS

2005/0031945 A1    2/2005  Morita et al.
2006/0019155 A1*   1/2006  Seman et al. ................. 429/159
(Continued)

FOREIGN PATENT DOCUMENTS

JP    8-87992 A     4/1996
JP    10-308205 A   11/1998
(Continued)

OTHER PUBLICATIONS

Machine translation for KR 1020070081533, Kim et al., Jun. 17, 2007.*
(Continued)

*Primary Examiner* — Barbara L Gilliam
*Assistant Examiner* — Adam A Arciero
(74) *Attorney, Agent, or Firm* — Birch, Stewart, Kolasch & Birch, LLP (57) ABSTRACT

Disclosed herein is an electrode terminal connecting member to connect two or more battery cells in series and/or in parallel to each other so as to manufacture a battery cell core pack, wherein the electrode terminal connecting member includes a plate body having a size sufficient to connect electrode terminals of the battery cells arranged in at least 2×2 matrix to each other, and the electrode terminals of the battery cells are directly coupled to the plate body in a state in which the plate body is not bent.

17 Claims, 9 Drawing Sheets

(51) Int. Cl.
*H01R 43/02* (2006.01)
*H01M 2/20* (2006.01)
*H01M 2/34* (2006.01)
H01M 10/052 (2010.01)
H01M 2/10 (2006.01)

(52) U.S. Cl.
CPC .......... *H01M 2/105* (2013.01); *H01M 10/052* (2013.01); *H01M 2200/00* (2013.01); *Y10T 29/49213* (2015.01); *Y10T 29/49218* (2015.01)

(58) Field of Classification Search
CPC .......................... H01M 2/34; Y02T 10/7011; Y10T 29/49213; Y10T 29/49218
See application file for complete search history.

(56) References Cited

U.S. PATENT DOCUMENTS

| | | |
|---|---|---|
| 2007/0065715 A1 | 3/2007 | Kim |
| 2007/0111088 A1* | 5/2007 | Kim .................... H01M 2/105 429/158 |
| 2007/0126394 A1 | 6/2007 | Kim et al. |
| 2008/0220315 A1 | 9/2008 | Dougherty et al. |

FOREIGN PATENT DOCUMENTS

| | | |
|---|---|---|
| JP | 2001-325931 A | 11/2001 |
| JP | 2001325931 A * | 11/2001 |
| JP | 2002-246003 A | 8/2002 |
| JP | 2002-246005 A | 8/2002 |
| JP | 2003-130710 A | 5/2003 |
| JP | 2003-242950 A | 8/2003 |
| JP | 2004-171856 A | 6/2004 |
| JP | 2004-327206 A | 11/2004 |
| JP | 2005-317368 A | 11/2005 |
| JP | 2005-317456 A | 11/2005 |
| JP | 2005-317460 A | 11/2005 |
| JP | 2006-216471 A | 8/2006 |
| JP | 2007-87944 A | 4/2007 |
| JP | 2007-250301 A | 9/2007 |
| JP | 2007-265855 A | 10/2007 |
| JP | 2007-280679 A | 10/2007 |
| JP | 2008-533682 A | 8/2008 |
| KR | 10-0889243 B1 | 6/2007 |
| KR | 10-2007-0081533 A | 8/2007 |
| KR | 10-0886572 B1 | 8/2007 |
| WO | WO 2007/064089 A1 | 6/2007 |

OTHER PUBLICATIONS

International Search Report dated May 25, 2010 in International Application No. PCT/KR2009/005869.

European Communication dated Jun. 13, 2016 in corresponding application No. 09 820 738.4.

* cited by examiner

CONNECTING MEMBER OF ELECTRODE TERMINALS FOR PREPARATION OF CORE PACK

TECHNICAL FIELD

The present invention relates to an electrode terminal connecting member used to manufacture a core pack, and, more particularly, to an electrode terminal connecting member to connect two or more battery cells in series and/or in parallel to each other so as to manufacture a battery cell core pack, wherein the electrode terminal connecting member includes a plate body having a size sufficient to connect electrode terminals of the battery cells arranged in at least 2×2 matrix to each other, and the electrode terminals of the battery cells are directly coupled to the plate body in a state in which the plate body is not bent.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

Depending upon kinds of external devices in which secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a battery pack needs to be used in middle or large-sized devices, such as laptop computers, portable digital versatile disc (DVD) players, small-sized personal computers (PCs), electric vehicles and hybrid electric vehicles, because high power and large capacity are necessary for the middle or large-sized devices.

A battery pack is manufactured by connecting a protection circuit to a core pack having a plurality of unit cells connected in series and/or in parallel to each other. In a case in which prismatic batteries or pouch-shaped batteries are used as the unit cells, the prismatic batteries or the pouch-shaped batteries are stacked so that large-sized surfaces of the prismatic batteries or the pouch-shaped batteries face each other, and then electrode terminals of the prismatic batteries or the pouch-shaped batteries are connected to each other by connecting members, such as bus bars. In a case in which a three-dimensional battery pack having a hexahedral structure is to be manufactured, therefore, the prismatic batteries or the pouch-shaped batteries are preferably used as unit cells of the battery pack.

On the other hand, cylindrical batteries generally have larger electric capacities than the prismatic batteries or the pouch-shaped batteries. However, it is difficult to arrange the cylindrical batteries in a stacked structure due to the external shape of the cylindrical batteries. In a case in which a battery pack is configured generally in a line type structure or in a plane type structure, though, the cylindrical batteries are structurally more advantageous than the prismatic batteries or the pouch-shaped batteries.

Consequently, a battery pack having a plurality of cylindrical batteries connected in parallel and series to each other is widely used in laptop computers, portable DVD players, and portable PCs. The battery pack may be configured in various core pack structures. For example, the core pack of the battery pack may be generally configured in a 2P (parallel)-3S (series) line type structure, a 2P-3S plane type structure, a 2P-4S line type structure or a 2P-4S plane type structure.

The parallel connection structure is achieved by arranging two or more cylindrical batteries in the lateral direction thereof so that the cylindrical batteries are adjacent to each other in a state in which electrode terminals of the cylindrical batteries are oriented in the same direction and connecting the electrode terminals of the cylindrical batteries to each other via connecting members by welding. The cylindrical batteries connected in parallel to each other may be referred to as a "bank."

The series connection structure is achieved by arranging two or more cylindrical batteries in the longitudinal direction thereof so that electrode terminals of the cylindrical batteries having opposite polarities are successively disposed one after another, or arranging two or more cylindrical batteries in the lateral direction thereof so that the cylindrical batteries are adjacent to each other in a state in which electrode terminals of the cylindrical batteries are oriented in opposite directions, and connecting the electrode terminals of the cylindrical batteries to each other via connecting members by welding.

The electrical connection between the cylindrical batteries is generally achieved by spot welding using thin plane type connecting members, such as nickel plates. Also, a protection circuit is connected to a core pack manufactured by connecting cylindrical batteries in parallel and/or in series to each other to manufacture a battery pack.

Figure 1:
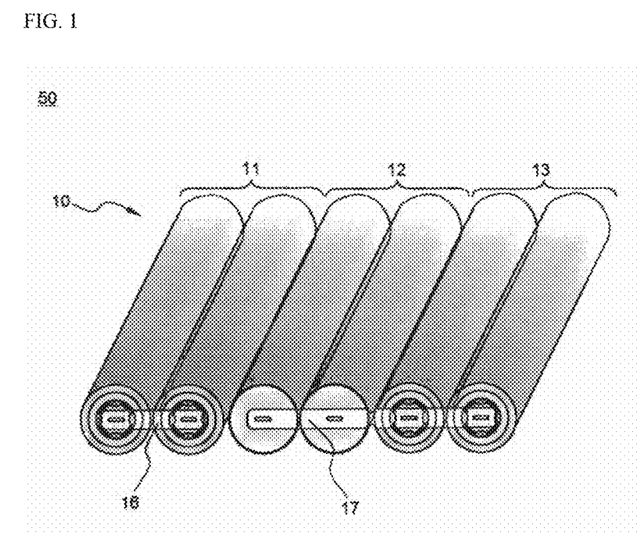
FIGS. 1 to 3 are typical views illustrating a series of processes to manufacture a battery cell core pack configured in a 2P-3S plane type structure using a conventional plane type connecting member.
Figure 2:
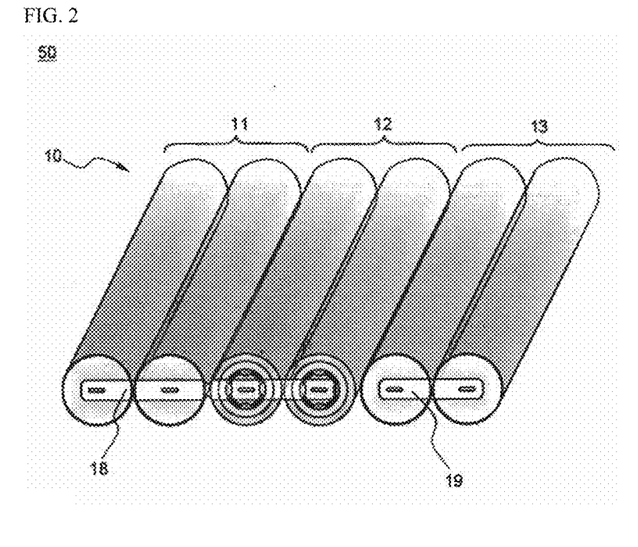
Figure 3:
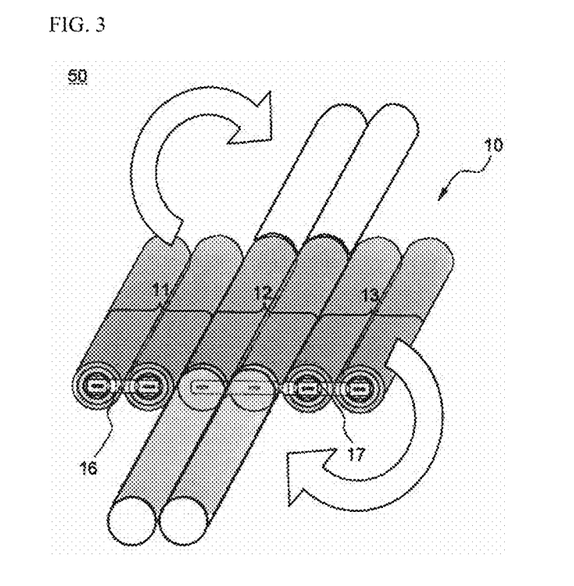

FIGS. 1 to 3 typically illustrate a series of processes to manufacture a core pack configured in a 2P-3S plane type structure using a conventional plane type connecting member.

Referring first to FIGS. 1 and 2, in order to manufacture a core pack 50 configured in a 2P-3S plane type structure, a total of 6 cylindrical batteries 10, as unit cells, are arranged in the lateral direction thereof to form three banks 11, 12 and 13.

In order to manufacture the core pack 50, first, the first bank 11 and the third bank 13 are disposed so that cathode terminals of the first bank 11 and the third bank 13 are oriented forward, and the second bank 12 is disposed in the direction opposite to the direction in which the first bank 11 and the third bank 13 are disposed so that anode terminals of the second bank 12 are oriented forward.

Subsequently, spot welding is carried out at the fronts (see FIG. 1) of the unit cells 10 in a state in which a first connecting member 16 is placed at the cathode terminals of the first bank 11, a second connecting member 17 is placed over the anode terminals of the second bank 12 and the cathode terminals of the third bank 13, thereby achieving the coupling between the connecting members 16 and 17 and the electrode terminals located at the fronts of the unit cells 10.

Subsequently, spot welding is carried out at the rears (see FIG. 2) of the unit cells 10 in a state in which a third connecting member 18 is placed over the anode terminals of the first bank 11 and the cathode terminals of the second bank 12, and a fourth connecting member 19 is placed at the anode terminals of the third bank 13, thereby achieving the coupling between connecting members 18 and 19 and the electrode terminals located at the rears of the unit cells 10.

Referring to FIG. 3 together with FIGS. 1 and 2, the third bank 13 is perpendicularly bent forward from the middle of the second connecting member 17, and the first bank 11 is perpendicularly bent rearward from the middle of the third connecting member 18, thereby manufacturing a core pack configured in a 2P-3S plane type structure. For information, P (parallel) indicates electrical parallel connection and S (series) indicated electrical series connection.

However, plane type connecting members are generally configured in a long bar type structure. In a case in which a plurality of cylindrical batteries arranged in the lateral direction thereof so that the cylindrical batteries are adjacent to each other is connected to each other via such plane type connecting members, it is difficult to carry out welding in a state in which the plane type connecting members are correctly placed at electrode terminals disposed at the tops and bottoms of the cylindrical batteries.

Also, when two or more cylindrical batteries are arranged in the lateral direction thereof so as to be adjacent to each other in a state in which electrode terminals of the cylindrical batteries are oriented in opposite directions, the electrode a terminals of the cylindrical batteries are connected to each other via a general long bar type connecting member, and the connection portion is bent in order to connect the cylindrical batteries in series to each other, it is difficult to accurately and stably bent the cylindrical batteries in a linear series structure and the bent portion may be broken since the width and thickness of the connecting member at the bent portion are thin.

That is, in a case in which a plurality of cylindrical batteries is connected to each other using a general plane type connecting member, it is difficult and complicated to connect the cylindrical batteries, thereby greatly lowering manufacturing efficiency of a battery pack.

In connection with this case, research has been conducted on technology to improve assembly efficiency of a battery pack. For example, Japanese Patent Application Publication No. 2001-325931 discloses the structure of an assembly battery in which a plurality of cylindrical battery cells is fixed and electrically connected to each other wherein circular grooves the inner diameter of each of which is slightly greater than the outer diameter of each of the battery cells are formed based on the number of the battery cells, and opposite ends of the battery cells are vertically fitted and fixed by two holder cases, made of an electrically insulative resin material, in which metal connection members to electrically connect the battery cells to each other are buried, so that the battery cells are connected in series to each other.

In the structure of the assembly battery, however, the electrically insulative resin material in which the metal connection members are buried with the result that the volume and weight of a battery pack are increased. Consequently, the battery cell receiving space of the battery pack is reduced, and energy density of the battery pack per unit volume is lowered.

Also, Japanese Patent Application Publication No. 2001-325931 discloses a connecting member for batteries used to connect two cylindrical batteries, which are arranged in parallel to each other in the radial direction thereof in a state in which the cylindrical batteries are disposed in opposite directions, in series to each other wherein the connecting member, which is formed in a plane shape, includes a first planar connection part joined to the bottom of one of the battery cells and a second connection part extending from the first connection part, the second connection part including an opening through which a cathode terminal of the other unit cell protrude and a circular groove bottom joined to a sealing plate of the other unit cell or a planar part having a step formed between the planar part and the first connection part.

However, it is difficult to use the connecting member for batteries in a case in which three or more cylindrical batteries are connected in series to each other. Also, the connecting member includes the first connection part and the second connection part. Consequently, a process to manufacture the connecting member is complicated, and productivity of a battery pack is lowered.

Consequently, there is a high necessity for technology to easily and efficiently achieve electrical connection between battery cells, thereby improving manufacturing efficiency and productivity of a battery pack while solving the above conventional problems.

DISCLOSURE

Technical Problem

Therefore, the present invention has been made to solve the above problems, and other technical problems that have yet to be resolved.

As the result of a variety of extensive and intensive studies and experiments to solve the problems as described above, the inventors of the present application have developed an electrode terminal connecting member including a plate body having a size sufficient to connect electrode terminals of battery cells arranged in at least 2×2 matrix to each other, wherein the electrode terminals of the battery cells are directly coupled to the plate body in a state in which the plate body is not bent, thereby simply and easily achieving the connection between the battery cells, and have found that it is possible to improve manufacturing efficiency and productivity of a battery pack through use of such an electrode terminal connecting member.

Therefore, it is an object of the present invention to provide an electrode terminal connecting member to simply and easily connect two or more battery cells in series and/or in parallel to each other, thereby improving productivity of a core pack and a battery pack.

Technical Solution

In accordance with one aspect of the present invention, the above and other objects can be accomplished by the provision of an electrode terminal connecting member to connect two or more battery cells in series and/or in parallel to each other so as to manufacture a battery cell core pack, wherein the electrode terminal connecting member includes a plate body having a size sufficient to connect electrode terminals of the battery cells arranged in at least 2×2 matrix to each other, and the electrode terminals of the battery cells are directly coupled to the plate body in a state in which the plate body is not bent.

That is, the electrode terminal connecting member according to the present invention is configured in a plate type structure in which electrode terminals of battery cells arranged in at least 2×2 matrix are connected to each other in a state in which the electrode terminal connecting member is not bent. When a plurality of battery cells is electrically connected to each other, therefore, it is possible to stably couple the electrode terminal connecting member to the electrode terminals of the battery cells in a state in which the electrode terminal connecting member is correctly placed at the electrode terminals of the battery cells, thereby efficiently achieving electrical connection between the battery cells.

Also, in a case in which core packs each including a large number of connected battery cells are mass-produced, automatic production of the core packs is possible, thereby greatly improving manufacturing efficiency and productivity of battery packs. For example, when the connecting member is coupled to the electrode terminals of the battery cells by welding, the size of a welding apparatus may be reduced, and a plurality of welding operations may be simultaneously carried out.

A core pack may be configured in a structure in which the row and column of the battery cells are maintained in a state in which the plate body is coupled to the electrode terminals of the respective battery cells. As needed, a core pack may be configured in a structure in which the row and column of the battery cells are changed in a state in which the plate body is coupled to the electrode terminals of the respective battery cells.

In a preferred example, the electrode terminal connecting member may be configured so that the plate body is provided at the edge thereof with inwardly depressed bending guide grooves, by which the plate body is bent in the row or column direction of the battery cells after the electrode terminals of the battery cells are coupled to the plate body.

Since the bending guide grooves are formed at the edge of the plate body of the electrode terminal connecting member, it is possible to easily bend the plate body in the row or column direction of desired battery cells or banks using even small force when the plate body is bent in a state in which the plate body is welded to electrode terminals of the battery cells or banks.

The shape of the plate body is not particularly restricted so long as the plate body can easily connect electrode terminals of battery cells arranged in at least 2×2 matrix are connected to each other. Preferably, the plate body is formed in a planar square or rectangular shape.

The connection between the electrode terminal connecting member and the battery cells or the banks is mainly achieved by welding. For example, the connection between the electrode terminal connecting member and the battery cells or the banks may be achieved by resistance welding, to which, however, the present invention is not limited. In this case, the plate body of the electrode terminal connecting member is preferably further provided with a slit, through which the plate body is easily resistance welded to the electrode terminals of the battery cells or the banks. For example, the slit may be a thin and long through hole.

In the structure of the electrode terminal connecting member having the bending guide grooves formed at the edge of the plate body as described above, as an example, the plate body may be further provided with a structure to easily bend the plate body. For example, the plate body may be further provided with a notch formed on an imaginary line vertically and/or horizontally connecting the respective bending guide grooves.

The notch serves to facilitate the electrode terminal connecting member to be bent and, at the same time, to guide the electrode terminal connecting member so that the electrode terminal connecting member can be correctly and stably bent.

As another example of the above structure, the plate body, at which the bending guide grooves are formed, may be further provided at the center thereof with a through hole so that the plate body can be easily bent by through hole. The shape of the through hole is not particularly restricted so long as the plate body can be easily bent by the through hole. Preferably, the through hole is formed in a planar circular or diamond shape.

Therefore, it is possible to more easily bend the plate body in the row or column direction of the battery cells or the banks in a state in which the battery cells or the banks are welded to the plate body by the notch and/or the through hole further formed at the plate body in the vicinity of the bending guide grooves.

Meanwhile, a battery pack is manufactured by connecting a protection circuit to a core pack including battery cells connected in parallel and/or in series to each other. Preferably, therefore, the core pack constituting the battery pack is configured in a circuit structure in which the core pack is connected to the battery cells and, at the same time, connected to a protection circuit board.

In order to achieve such a circuit configuration, therefore, the plate body of the electrode terminal connecting member may be provided at the edge thereof with a protection circuit board (PCB) connection part protruding in one direction.

The plate body may be formed of a nickel plate made of nickel exhibiting electrical conductivity, to which, however, the present invention is not limited.

Various forms of batteries may be used as the battery cells. For example, each of the battery cells may be a cylindrical battery or a prismatic battery. Preferably, each of the battery cells is a cylindrical battery.

Generally, a cylindrical battery is configured in a structure in which a cathode terminal protrude from one end of the cylindrical battery, and the entirety of a battery case forms an anode terminal in a state in which the battery case is insulated from the cathode terminal. In a case in which cathode terminals of unit cells arranged in the lateral direction thereof, i.e. a bank, therefore, it is preferable to weld the metal plate to the cathode terminals of the bank in a state in which an insulation sheet is disposed to cover the top of the bank so that only the cathode terminals are exposed to the outside.

In accordance with another aspect of the present invention, there is provided a battery cell core pack wherein an electrode terminal connecting member with the above-stated construction is connected to a PCB.

In a preferred example, the battery cell core pack may be configured in a structure in which the electrode terminal connecting member electrically connecting the electrode terminals of the battery cells is directly connected to the protection circuit board. Consequently, it is possible to easily achieve automation, thereby greatly improving productivity and quality, as compared with a conventional method of manually achieving the electrical connection between the electrode terminals of the battery cells and the protection circuit board using a wire.

In a concrete example, a plate body of the electrode terminal connecting member may be provided at the edge thereof with a PCB connection part protruding in one direction, and the PCB may be provided with a connection coupling part into which the connection part is inserted and coupled.

The structure of the connection coupling part is not particularly restricted so long as the connection part is easily into the connection coupling part. Preferably, the connection coupling part includes an insertion hole through which the connection part is inserted and coupling part to which an end of the inserted connection part is coupled, the coupling part being formed along the outer circumference of the insertion hole so as to have a predetermined width.

In the above structure, the shape of the insertion hole is not particularly restricted so long as the connection part of the electrode terminal connecting member can be easily inserted through the insertion hole. For example, the insertion hole may be a slit-shaped through hole or may be formed in a U shape open at the top thereof.

In a case in which the insertion hole is formed in such a U shape, the U-shaped insertion hole may be chamfered or rounded at opposite corners thereof so that the connection part of the electrode terminal connecting member can be easily inserted through the insertion hole from above.

Meanwhile, the coupling between the connection part of the electrode terminal connecting member and the protection circuit board may be achieved in various ways. For example, the coupling between the connection part of the electrode terminal connecting member and the protection circuit board may be achieved by soldering or welding.

The welding may include laser welding or resistance welding, which achieves stable coupling between the battery cells and the protection circuit board without damage to or deformation of the battery cells and the protection circuit board. Preferably, the welding includes spot welding or seam welding.

Generally, automation is easily achieved using laser welding and resistance welding as compared with soldering. For information, laser welding is a method of melting metal using laser beams to achieve welding, and resistance welding is a method of supplying electric current to a welding base material to heat the welding base material using heat generated by contact resistance at a joint so that the welding base material is molten, and applying mechanical pressure to achieve welding.

In accordance with another aspect of the present invention, there is provided a battery pack including a battery cell core pack with the above-stated construction mounted in a pack case.

Kinds of devices for which the battery pack is used as a power source are not particularly restricted. Preferably, the battery pack is used as a power source for laptop computers.

In accordance with a further aspect of the present invention, there is provided a method of manufacturing a battery cell core pack by connecting two or more battery cells in series and/or in parallel to each other.

Specifically, the manufacturing method includes (a) welding an electrode terminal connecting member including a plate body having a size sufficient to connect electrode terminals of the battery cells arranged in at least 2×2 matrix to each other and inwardly depressed bending guide grooves formed at the edge of the plate body to the electrode terminals of the battery cells, (b) bending the electrode terminal connecting member along the bending guide grooves to arrange the battery cells in a line, (c) inserting a connection part protruding from the edge of the plate body in one direction through a connection coupling part of a protection circuit board formed in a shape corresponding to the connection part, (d) bending an end of the connection part protruding outward from the connection coupling part of the protection circuit board, and (e) soldering or welding the bent end of the connection part to a coupling part of the protection circuit board.

In the method of manufacturing the battery cell core pack according to the present invention, as described above, an electrode terminal connecting member including a plate body having a size sufficient to connect electrode terminals of the battery cells arranged in at least 2×2 matrix to each other and inwardly depressed bending guide grooves formed at the edge of the plate body to the electrode terminals of the battery cells is welded to the electrode terminals of the battery cells and is then bent. Consequently, it is possible to more simply and easily manufacture a core pack configured in a structure in which battery cells are in series and/or in parallel to each other in various ways.

Also, after the end of the connection part of the plate body is inserted into the connection coupling part of the protection circuit board, the coupling between the connection part of the plate body is simply coupled to the connection coupling part of the protection circuit board, thereby achieving the coupling between the battery cells and the protection circuit board. Consequently, it is possible to easily achieve automation, thereby greatly improving productivity, as compared with a conventional method of achieving the connection between the battery cells and the protection circuit board using a wire.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments. For easy understanding, some of the drawings are shown as partial see-through views.

Figure 4:
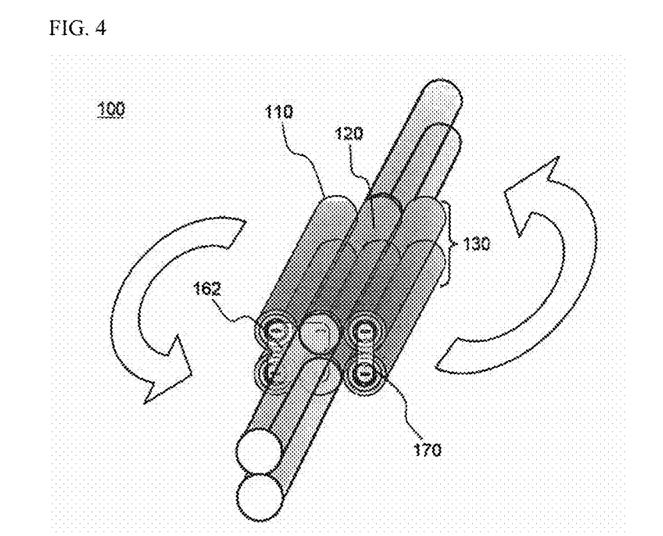
FIG. 4 is a typical view illustrating a process to manufacture a battery cell core pack configured in a 2P-3S plane type structure according to an embodiment of the present invention.

FIG. 4 is a typical view illustrating a process to manufacture a battery cell core pack configured in a 2P-3S plane type structure according to an embodiment of the present invention.

Referring to FIG. 4, a battery cell core pack 100 is configured in a structure in which three banks 110, 120 and 130, each of which includes two vertically stacked cylindrical batteries, are arranged in the lateral direction thereof so as to be adjacent to each other. That is, the battery cell core pack 100 is configured in a 2×3 matrix type battery cell structure.

The first bank 110 and the third bank 130 are erected so that cathode terminals of the first bank 110 and the third bank 130 are oriented forward, and the second bank 120 is erected in the direction opposite to the direction in which the first bank 110 and the third bank 130 are erected so that anode terminals of the second bank 120 are oriented forward. A first connecting member 162 and a second connecting member 70 are mounted to the front electrode terminals of the banks 110, 120 and 130.

The first connecting member 162, formed in a planar quadrangular shape, electrically connects the cathode terminals of the first bank 110 and the anode terminals of the second bank 120 in parallel to each other. Also, the first connecting member 162 electrically connects the cathode terminals of the first bank 110 and the anode terminals of the second bank 120 in series to each other. The second connecting member 170, formed in a planar quadrangular shape, electrically connects the cathode terminals of the third bank 130 in parallel to each other.

Also, at the rear (not shown) of the battery cell structure, a third connecting member (not shown), formed in the same shape as the first connecting member 162, electrically connects anode terminals of the third bank 130 and cathode terminals of the second bank 120 in series to each other, and a fourth connecting member (not shown), formed in the same shape as the second connecting member 170, electrically connects anode terminals of the first bank 110 in parallel to each other.

In this coupled state, the first bank 110 is perpendicularly bent forward from the middle of the first connecting member 162 and is perpendicularly bent backward from the middle of the third connecting member (not shown), thereby manufacturing a battery cell core pack configured in a 2P-3S plane type structure.

Also, the first connecting member 162 and the third connecting member (not shown) are formed in the planar square shape, as previously described, and therefore, the first connecting member 162 and the third connecting member can be easily coupled to the electrode terminals of the battery cells arranged in a 2×2 matrix.

In addition, the structure of the first connecting member 162 enables spot welding to be stably carried out and welding to be simultaneously at the corresponding regions in a limited space. Also, the connecting member is prevented from being broken during bending the connecting member since the size of the bent region of the connecting member is large.

FIGS. 5 to 9 are plan views typically illustrating electrode terminal connecting members according to various embodiments of the present invention.

Figure 5:
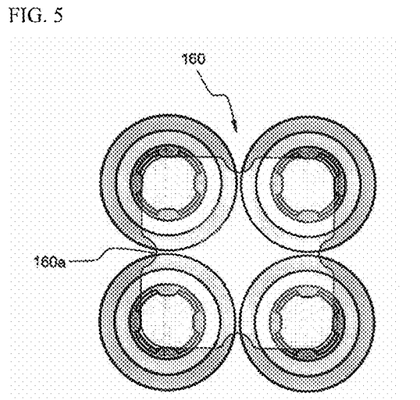
FIGS. 5 to 9 are plan views typically illustrating electrode terminal connecting members according to various embodiments of the present invention.

Referring first to FIG. 5, an electrode terminal connecting member 160 includes a plate body, formed in a planar square shape, to simultaneously connect electrode terminals of battery cells arranged in a 2×2 matrix to each other and a bending guide groove 160a depressed inward from the middle of each side of the plate body.

Figure 6:
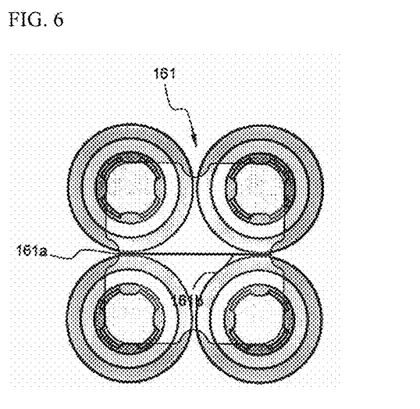

An electrode terminal connecting member 161 of FIG. 6 includes a bending guide groove 161a formed at the middle of each side of a plate body and a notch 161b formed at the plate body on an imaginary line horizontally connecting the corresponding bending guide grooves 161a. The notch 161b may be a linear groove minutely formed at the plate body. The groove may be a singly continuous line or a plurality of discontinuous lines.

Figure 7:
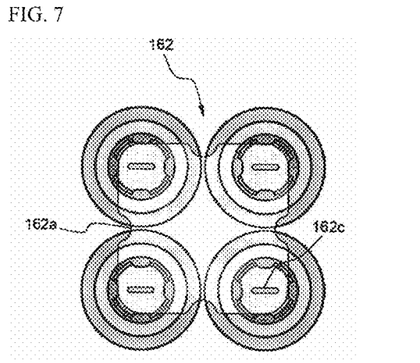

An electrode terminal connecting member 162 of FIG. 7 includes a bending guide groove 162a formed at the middle of each side of a plate body and a slit 162c, formed at each corner of the plate body, by which resistance welding to a corresponding electrode terminal is easily carried out.

Figure 8:
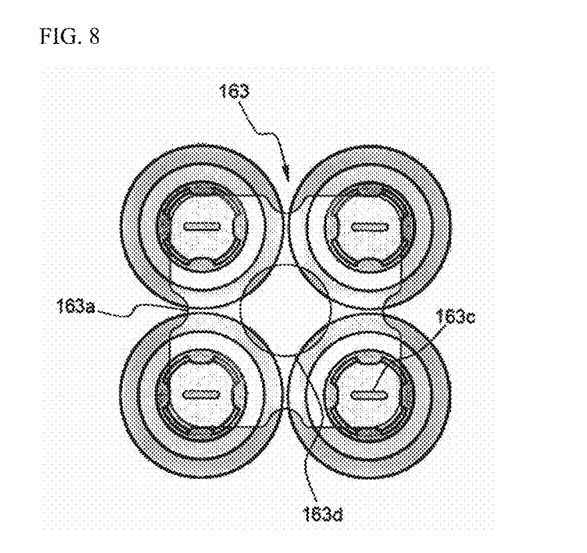
Figure 9:
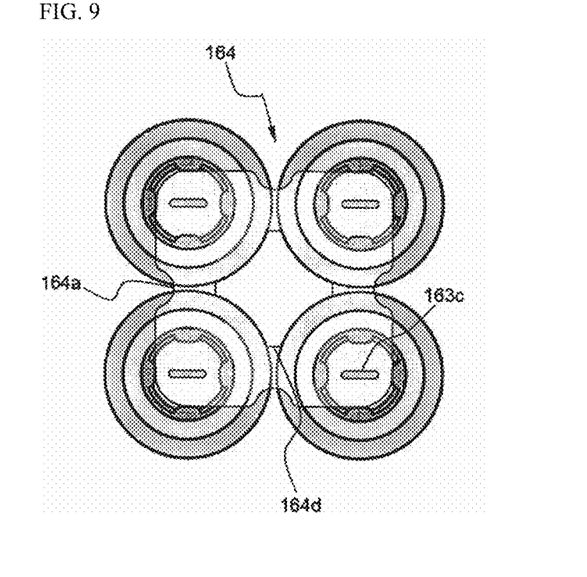

An electrode terminal connecting member 163 of FIG. 8 is identical in structure to the electrode terminal connecting member 162 of FIG. 7 except that a circular through hole 163d, by which the electrode terminal connecting member 163 is easily bent, is formed at the center of a plate body. An electrode terminal connecting member 164 of FIG. 9 is identical in structure to the electrode terminal connecting member 162 of FIG. 7 except that a diamond through hole 164d, by which the electrode terminal connecting member 163 is easily bent, is formed at the center of a plate body. The through holes 163d and 164d reduce the size of the respective plate bodies to be bent, and therefore, the respective plate bodies can be easily bent. The electrode terminal connecting members 163 and 164 each includes slits 163c similar to slits 162c.

Figure 10:
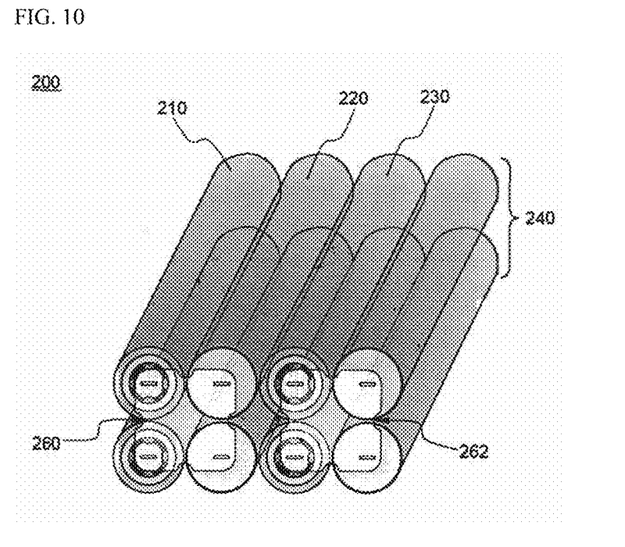
FIG. 10 is a typical view illustrating a battery cell core pack configured in a 2P-4S plane type structure according to another embodiment of the present invention.

FIG. 10 is a typical view illustrating a battery cell core pack configured in a 2P-4S plane type structure according to another embodiment of the present invention.

Referring to FIG. 10, a battery cell core pack 200 is configured in a structure in which four banks 210, 220, 230 and 240, each of which includes two cylindrical batteries, are arranged in the lateral direction thereof, and electrode terminal connecting members 260 and 262 are coupled to the tops of electrode terminals of the respective banks 210, 220, 230 and 240 by spot welding.

The first bank 210 and the third bank 230 are erected so that cathode terminals of the first bank 210 and the third bank 230 are oriented forward, and the second bank 220 and the fourth bank 240 are erected in the direction opposite to the direction in which the first bank 210 and the third bank 230 are erected so that anode terminals of the second bank 220 and the fourth bank 240 are oriented forward.

At the fronts of the banks 210, 220, 230 and 240, the first connecting member 260 is coupled to the tops of the cathode terminals of the first bank 210 and to the tops of the anode terminals of the second bank 220. Also, the second connecting member 262, formed in the same shape as the first connecting member 260, is coupled to the tops of the cathode terminals of the third bank 230 and to the tops of the anode terminals of the fourth bank 240.

At the rear (not shown) of such a battery cell structure, on the other hand, a third connecting member (not shown), formed in a rectangular shape, is coupled to the tops of cathode terminals of the fourth bank 240, and a fourth connecting member (not shown), formed in the same shape as the first connecting member 260, is coupled to coupled to the tops of cathode terminals of the second bank 220 and to the tops of anode terminals of the third bank 230. Also, a fifth connecting member (not shown), formed in a rectangular shape, is coupled to the tops of anode terminals of the first bank 210.

In the above structure, therefore, the banks 210, 220, 230 and 240 are electrically connected to each other in a 2P-4S structure.

Figure 11:
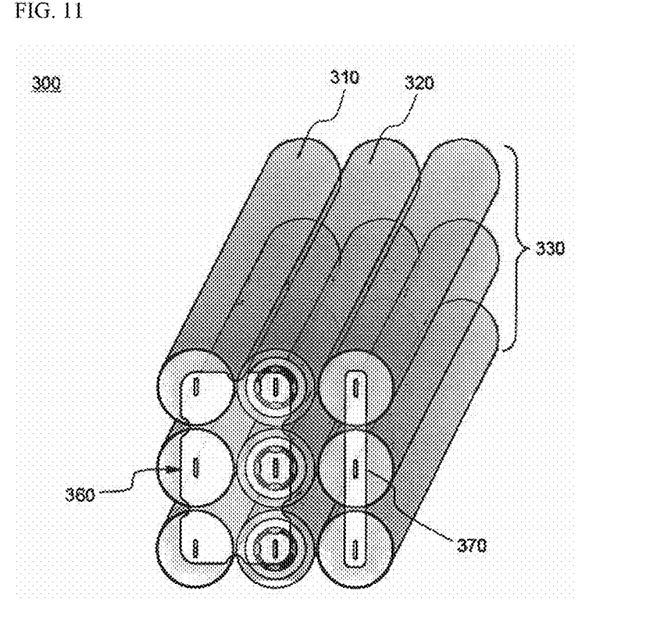
FIG. 11 is a typical view illustrating a battery cell core pack configured in a 3P-3S plane type structure according to another embodiment of the present invention.

FIG. 11 is a typical view illustrating a battery cell core pack configured in a 3P-3S plane type structure according to another embodiment of the present invention.

Referring to FIG. 11, a battery cell core pack 300 is configured in a structure in which three banks 310, 320 and 330, each of which includes three cylindrical batteries, are arranged in the lateral direction thereof, and electrode terminal connecting members 360 and 370 are coupled to the tops of electrode terminals of the respective banks 310, 320 and 330 by spot welding. The structure of FIG. 11 is identical to that of FIG. 11 except that the structure of FIG. 11 is a 3P-3S plane type structure, and therefore, a detailed description thereof will not be given.

Figure 12:
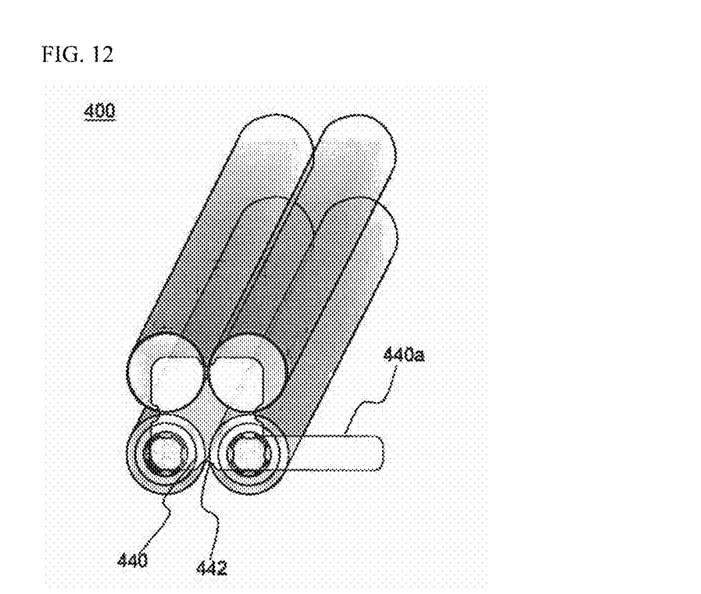
FIGS. 12 and 13 are typical views illustrating electrode terminal connecting members, a protection circuit board (PCB) connection part of each of which protrude in one direction, according to other embodiments of the present invention.
Figure 13:
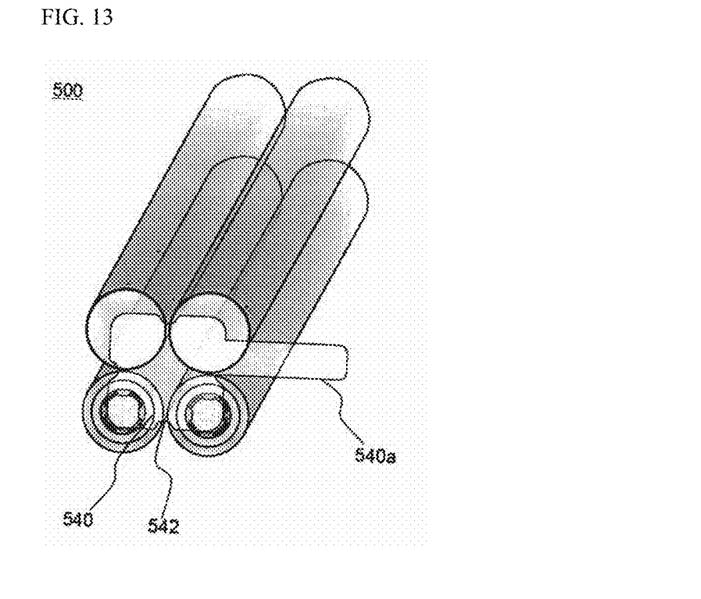

FIGS. 12 and 13 are typical views illustrating electrode terminal connecting members, a protection circuit board (PCB) connection part of each of which protrude in one direction, according to other embodiments of the present invention.

Referring first to FIG. 12, cylindrical batteries 400 are arranged in a 2×2 matrix, and an electrode terminal connecting member includes a square plate body 440 having a bending guide groove 442 formed at the middle of each side thereof and a PCB connection part 440a protruding from the lower end of one side of the plate body 440.

Therefore, the electrode terminal connecting member electrically connects electrode terminals of the cylindrical batteries 400 to each other and, at the same time, electrically connects the electrode terminals of the cylindrical batteries 400 to a PCB (not shown).

An electrode terminal connecting member of FIG. 13 is identical to that of FIG. 12 except that a PCB connection part 540a horizontally protrudes from the upper end of one side of a square plate body 540, having a bending guide groove 542 formed at the middle of each side thereof, to the right, and therefore, a detailed description thereof will not be given.

The core packs 200, 300, 400 and 500 of FIGS. 10 to 13 may be modified into predetermined forms by bending the connecting members in the same manner as in FIG. 3 as needed.

Figure 14:
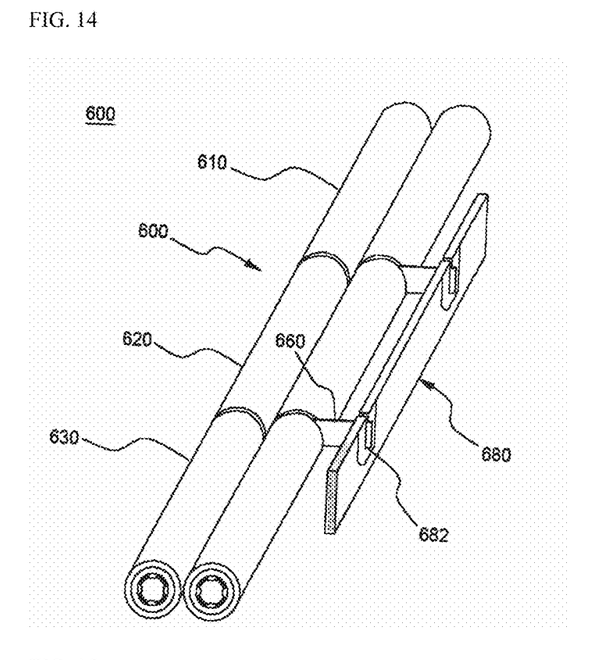
FIG. 14 is a typical view illustrating a battery cell core pack in which electrode terminal connecting members, one of which is shown in FIG. 13, are fitted in a PCB.

FIG. 14 is a typical view illustrating a battery cell core pack in which the electrode terminal connecting members, one of which is shown in FIG. 13, are fitted in a PCB.

Referring to FIG. 14, a battery cell core pack 600 is configured so that which three banks 610, 620 and 630 are electrically connected to each other in a 3S-2P structure, and electrode connecting members (not shown) are disposed between the respective banks 610, 620 and 630. Connection parts, protruding in one direction, are inserted through respective connecting coupling parts 682 of a PCB 680.

Figure 15:
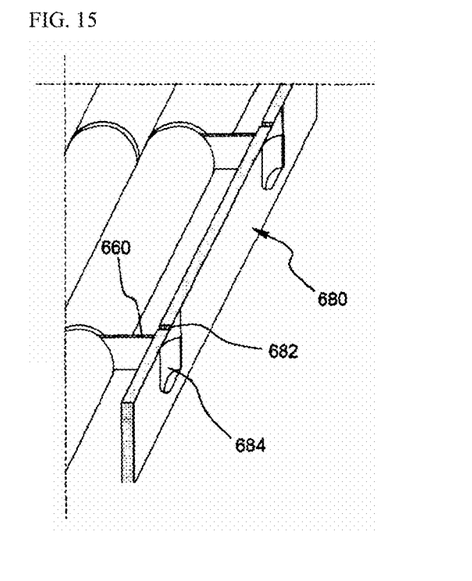
FIG. 15 is a partial typical view illustrating a battery cell core pack in which electrode terminal connecting members, one of which is shown in FIG. 13, are soldered to a PCB.

FIG. 15 is a partial typical view illustrating a battery cell core pack in which electrode terminal connecting members, one of which is shown in FIG. 13, are soldered to a PCB.

Referring to FIG. 15, connection parts 660 of electrode terminal connecting members are inserted through insertion holes 682 of a PCB 680, and ends of the respective connection parts 660 are coupled to coupling parts 684 of the PCB 680 by soldering.

Figure 16:
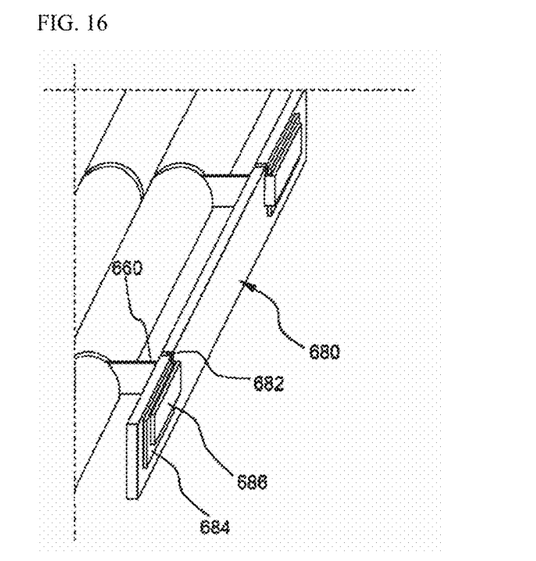
FIG. 16 is a partial typical view illustrating a battery cell core pack in which electrode terminal connecting members, one of which is shown in FIG. 13, are resistance welded to a PCB.

FIG. 16 is a partial typical view illustrating a battery cell core pack in which electrode terminal connecting members, one of which is shown in FIG. 13, are resistance welded to a PCB.

Referring to FIG. 16, connection parts 660 of electrode terminal connecting members are inserted through insertion holes 682 of a PCB 680, ends 686 of the respective connection parts 660 are bent perpendicularly to the PCB 680, and the ends 686 are coupled to coupling parts 684 of the PCB 680 by spot welding.

FIGS. 17 to 20 are partial typical views illustrating connection coupling parts formed at a PCB according to various embodiments of the present invention.

Figure 17:
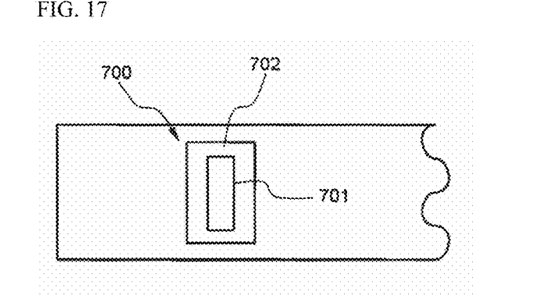
FIGS. 17 to 20 are partial typical views illustrating connection coupling parts formed at a PCB according to various embodiments of the present invention.

Referring first to FIG. 17, a connection coupling part 700 includes a slit-shaped through hole 701, through which a connection part (not shown) of an electrode terminal connecting member is inserted, and a coupling part 702, having a predetermined width, formed at the outer circumference of the through hole 701 so as to be coupled to the end of the connection part of the electrode terminal connecting member by spot welding.

Figure 18:
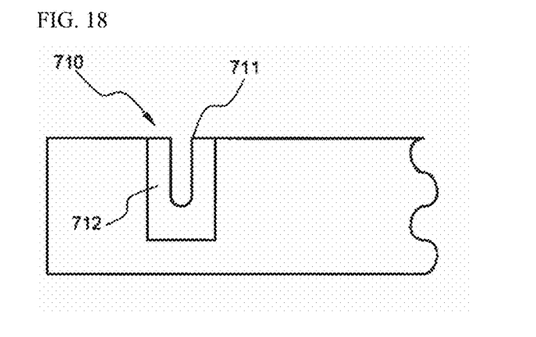

Referring to FIG. 18, a connection coupling part 710 includes an insertion hole 711 formed in a U shape open at the top thereof and a coupling part 712 configured to be coupled to the end of a connection part (not shown) of an electrode terminal connecting member inserted through the insertion hole 711.

Figure 19:
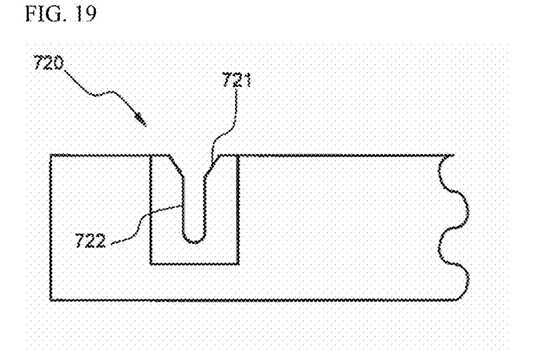
Figure 20:
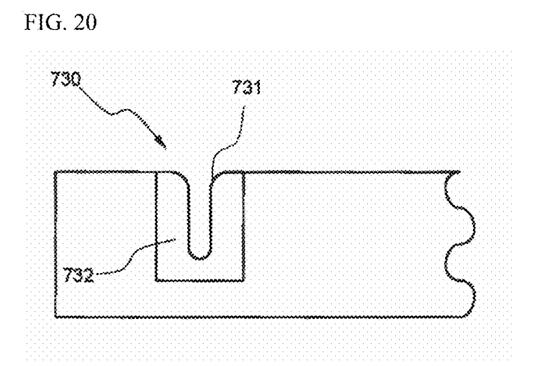

Referring to FIGS. 19 and 20, insertion holes 722 and 732 of connection coupling parts 720 and 730 are chamfered (721) or rounded (731) at opposite corners thereof so that a connection part (not shown) of an electrode terminal connecting member can be more easily inserted through the insertion holes.

The coupling parts 702, 712, 722 and 732 are electrically connected to a protection circuit of the PCB. For example, the coupling parts 702, 712, 722 and 732 may be made of a metal material.

INDUSTRIAL APPLICABILITY

As is apparent from the above description, an electrode terminal connecting member according to the present invention is configured in a plate type structure in which electrode terminals of battery cells arranged in at least 2×2 matrix are connected to each other in a state in which the electrode terminal connecting member is not bent. Consequently, it is possible to stably couple the electrode terminal connecting member to the electrode terminals of the battery cells in a state in which the electrode terminal connecting member is correctly placed at the electrode terminals of the battery cells, thereby easily achieving electrical connection between the battery cells.

Also, in a case in which core packs each including a large number of variously connected batteries are mass-produced, automation is possible, thereby greatly improving manufacturing efficiency and productivity of battery packs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode terminal connecting member to connect two or more battery cells in series and/or in parallel to each other so as to manufacture a battery cell core pack, the electrode terminal connecting member being movable from an unbent state to a bent state, wherein the electrode terminal connecting member comprises a plate body configured to connect electrode terminals of the battery cells arranged in at least 2×2 matrix to each other, and the electrode terminals of the battery cells are directly coupled to the plate body in a state in which the plate body is not bent in the unbent state, wherein the plate body includes four sides, and each side is provided therewith an inwardly depressed bending guide groove, by which the plate body is bent in a row or column direction of the battery cells after the electrode terminals of the battery cells are directly coupled to the plate body, a portion of the plate body overlapping another portion of the plate body in the bent state, wherein the plate body is further provided with a notch formed on a line vertically and/or horizontally connecting the respective bending guide grooves so that the plate body is bendable about the notch along the line, and wherein the plate body of the electrode terminal connecting member is provided at the edge thereof with a protection circuit board (PCB) connection part protruding in one direction.

2. The electrode terminal according to claim 1, wherein the notch extends as an uninterrupted continuous line between the respective bending guide grooves.

3. The electrode terminal connecting member according to claim 1, wherein the plate body is formed in a planar square or rectangular shape.

4. The electrode terminal connecting member according to claim 1, wherein the plate body is further provided with a slit, through which the plate body is resistance welded to the electrode terminals of the battery cells.

5. The electrode terminal connecting member according to claim 1, wherein the plate body is further provided at the center thereof with a through hole so that the plate body is bendable at the through hole, and wherein the plate body is provided with a plurality of slits corresponding to the electrode terminals of the battery cells directly coupled to the plate body through which the plate body is resistance welded to the electrode terminals of the battery cells.

6. The electrode terminal connecting member according to claim 5, wherein the through hole is formed in a planar circular or diamond shape.

7. The electrode terminal connecting member according to claim 1, wherein the plate body is formed of a nickel plate.

8. The electrode terminal connecting member according to claim 1, wherein each of the battery cells is a cylindrical battery.

9. A battery cell core pack wherein the electrode terminal connecting member according to claim 1 is connected to a PCB.

10. The battery cell core pack according to claim 9, wherein the PCB is provided with a connection coupling part into which the connection part is inserted and coupled.

11. The battery cell core pack according to claim 10, wherein the connection coupling part comprises an insertion hole through which the connection part is inserted and coupling part to which an end of the inserted connection part is coupled, the coupling part being formed along the outer circumference of the insertion hole so as to have a predetermined width.

12. The battery cell core pack according to claim 11, wherein the insertion hole is a slit-shaped through hole or is formed in a U shape open at the top thereof.

13. The battery cell core pack according to claim 12, wherein the U-shaped insertion hole is chamfered or rounded at opposite corners thereof so that a connection part of the electrode terminal connecting member can be inserted through the insertion hole from above.

14. The battery cell core pack according to claim 9, wherein the coupling between the connection part and the PCB is achieved by soldering or welding.

15. The battery cell core pack according to claim 14, wherein the welding comprises spot welding or seam welding.

16. A battery pack comprising a battery cell core pack according to claim 9 mounted in a pack case.

17. The battery pack according to claim 16, wherein the battery pack is used as a power source for laptop computers.

* * * * *